G. D. OLDS, Jr.
MACHINE FOR EXTRACTING AND SHREDDING COCONUT MEAT.
APPLICATION FILED MAR. 30, 1921.

1,438,714.

Patented Dec. 12, 1922.
5 SHEETS—SHEET 2.

Fig. 2.

Inventor
George D. Olds, Jr.
By his Attorneys
Pennie, Davis, Marvin & Edmonds

Patented Dec. 12, 1922.

1,438,714

UNITED STATES PATENT OFFICE.

GEORGE D. OLDS, JR., OF BROOKLYN, NEW YORK.

MACHINE FOR EXTRACTING AND SHREDDING COCONUT MEAT.

Application filed March 30, 1921. Serial No. 457,050.

*To all whom it may concern:*

Be it known that I, GEORGE D. OLDS, Jr., a citizen of the United States, residing at Brooklyn, in the county of Kings, State of New York, have invented certain new and useful Improvements in Machines for Extracting and Shredding Coconut Meat; and I do hereby declare the following to be a full, clear, and exact description of the invention, such as will enable others skilled in the art to which it appertains to make and use the same.

The present invention relates to a machine for automatically extracting and shredding the meat from a coconut, and embodies in its construction mechanisms whereby the nut may be cut open, the meat extracted from the separate parts thereof, shredded, and the shreds cut into short lengths. The mechanisms for performing each of the different operations, and the machine in which such mechanisms are brought together and coordinated to perform all of the operations automatically one after another in a continuous series of steps, constitute separate features of the present invention.

The invention comprehends as one of its parts a machine of this character having a holder for a portion of a nut, one end of which is open to expose the meat therein, the nut previous to being inserted in the holder having first been cut open by suitable means transversely of its longer axis. A tool is provided for extracting the meat from the shell of the portion of the nut held in the holder, and means are embodied in the machine for moving the holder and the tool relatively one to the other, such means being constructed and arranged so that the meat of the nut is subjected to the action of the extracting tool. The holder and extracting tool may be rotated one relatively to the other, and the means for moving the tool and the holder relatively to subject the meat of the nut to the action of the extracting tool may be constructed and arranged so that the holder is stationary and the extracting tool is fed thereto. Or the tool may be stationary and the holder moved relatively thereto to feed the meat of the nut against the tool. Also the holder may be rotated relatively to the tool and the tool fed against the holder, or the holder may be both rotated and fed against the tool to subject the meat of the nut to the action of the extracting tool. The machine may, moreover, include in its construction a carriage on which the extracting tool is mounted and devices whereby the carriage is moved relatively to the holder, or the holder may be mounted on the carriage which is then moved relatively to the tool.

Irrespective of the construction and arrangement of the means for moving the holder and the tool relatively one to the other to expose the meat of the nut to the action of the extracting tool, or the particular manner of operation of such means, but in combination therewith, the invention comprehends as another of its parts, a machine having a holder for the nut, a dividing tool, preferably a circular, adjustable tool, for opening the nut, and a tool for extracting the meat from the shell thereof. Means may be included in the machine, whereby the dividing tool is advanced to an operative position and retracted after the cutting operation to an inoperative position, such means being preferably manually operable. The dividing tool preferably comprises a grinding tool for penetrating the shell of the nut and a cutting tool for cutting through the meat thereof, in which case the means for advancing and retracting the dividing tool is constructed and arranged first to advance the grinding tool and then the cutting tool to operative positions respectively, and for then retracting both to inoperative positions after the dividing operation, which means may be arranged so as to be manually operable.

Whether or not the machine includes in its construction a dividing tool for cutting open the nut prior to subjecting the nut to the action of a tool for extracting the meat therefrom, but preferably including such a tool, the invention comprehends as another of its parts, a machine of this character in which there is a holder for the nut and a cutting tool having a cutting edge extending transversely of the axis of the holder and preferably upwardly and rearwardly. The holder and cutting tool are moved relatively one to the other by appropriate means to feed the meat of the nut against the cutting edge of the tool. The cutting tool may be provided with means for guiding the edge of the cutting tool along the interior surface of the skin between the meat and the shell and for spacing the cutting edge a slight amount therefrom to prevent the shaving of the skin by the tool. The means for guiding the end of the cutting edge is so constructed that the tool follows the skin and is at all times in contact therewith during the movement of the cutting edge against the meat of the nut. Preferably the cutting tool is made adjustable relatively to the holder so that not only may the depth of the cut be regulated, but also the position of the tool may be altered to accommodate nuts of different sizes. The machine may, in addition to having a cutting tool for extracting the meat from the nut, be provided with means for shredding the meat, in which case the means for extracting the meat from the nut include a shredding tool which is constructed so that the meat, as it is extracted from the shell, is cut into strips. Such a shredding tool may comprise a plurality of substantially parallel cutting edges preferably extending upwardly, in conjunction with a cutting tool for first cutting the meat from the shell of the nut. Where the cutting tool has a cutting edge extending transversely of the axis of the holder, the shredding tool may consist of a plurality of cutting edges extending transversely of and beyond the edge of the cutting tool, which arrangement insures a clean cut and precludes the tearing of the shreds from the meat of the nut as they are being cut off. The cutting and shredding tools are preferably combined in a unit tool which operates to extract the meat from the shell and to cut it into shreds, and, in this unit, the cutting tool has its cutting edge extending transversely of the axis of the holder and the shredding tool has a plurality of cutting edges disposed transversely of and beyond the edge of the cutting tool. Furthermore, in this arrangement means are provided for guiding the cutting and shredding unit along and for spacing it from the interior surface of the shell, and also means for adjusting the unit and the holder relatively to regulate the depth of the cut and the position of the tools for different sizes of nuts. In the specific embodiment of the invention described hereinafter, the cutting and shredding unit is pivotally mounted in the machine and has resilient means connected thereto for pressing the unit against the shell of the nut.

Irrespective of the construction and arrangement of the cutting and shredding tools, the machine may also include in its construction means for chopping the strips produced by the shredding tool into comparatively short lengths. Such means may consist of a cutter, as for example a reciprocating cutter, and, in the latter case, means are included for actuating the reciprocating cutter. But whether or not the cutter is reciprocating, and irrespective of the means for actuating it, a conveying chute may be provided for carrying the shredded meat produced by the machine to a receptacle.

By combining the various parts of the present invention, described in the foregoing, in a single machine, the extraction of the meat from the coconut thereof into strips, and the cutting of the strips into short lengths may be made entirely automatic and one continuous operation, and so the invention comprehends as still another of its parts an automatic machine for extracting coconut meat in which there is a holder for gripping one end of the nut, a cooperative holder movable relatively to the first holder for gripping the other end of the nut, a dividing tool for separating the nut between its ends, means for extracting the meat from the separate parts of the nut, and means for moving the holders and extracting means relatively one to the other, which is constructed and arranged so that the meat in each of the parts of the nut is subjected, preferably simultaneously, to the action of the extracting means. The meat extracting means may comprise sets of tools which are adapted to coact with each of the holders, the tools and holders being rotatable one relatively to the other. One of the sets of extracting tools and the cooperative holder may be mounted on a movable carriage which is actuated by appropriate devices for moving it relatively to the other of said sets of tools and holder, first in a direction axially of the holders to bring the cooperative holder in engagement with the nut, then laterally after the separation of the nut to bring the parts thereof opposite their respective extracting tools, and finally again axially to subject the meat in the parts to the action of the extracting tools, the actuating devices being controlled by manually operable means. Furthermore, the machine may have a table upon which one of the sets of extracting tools and one holder are mounted, the other of the sets of extracting tools and holder being mounted on a carriage supported on the table, and arranged to move longitudinally and laterally thereof. The devices for actuating the carriage may comprise a screw in engagement therewith, in which case means are included for driving the screw, and the carriage may be provided with a rack which is in engagement with a pinion, the driving means being controlled and the pinion being rotated by manually operable means. Where the machine has a table and one of the holders for gripping one end of the nut and one of the extracting tools are both mounted on the table, a driving connection may be provided for rotating the holder, and where a carriage is included for mounting the other set of extracting tools and holder, a shaft may be mounted on the carriage, the end of which supports a second holder, the other extracting tool also being mounted on the carriage. In this arrangement, the shaft is provided with a clutch having a stationary member which, when thrown into engagement, prevents the rotation of the shaft while the carriage is being advanced toward the holder and tool supported on the table, and so when the second holder engages the nut, the screw threads on the interior surfaces of both holders travel over the outside surface of the shell of the nut to grip it, since the holder on the table is constantly rotating and the second holder held stationary. In this construction, the screw is also provided with a clutch, and means are included for operating the clutches; also a dividing tool which is so constructed and arranged that when moved in one direction, it may be operated to advance or retract the dividing tool, and in the opposite direction to operate the clutches.

In the specific embodiment of the invention described hereinafter, means are provided for both extracting and shredding the meat from the coconut, and the machine embodies in its construction a table, a carriage having a rack thereon, a pinion in engagement with the rack, a reciprocating rack bar for actuating the pinion, a holder for gripping one end of the nut and a tool for extracting coconut meat both mounted on the table, a driving connection for rotating said holder, a shaft and an extracting tool mounted on said carriage, a clutch on said shaft having a stationary member, a second holder supported on said shaft, a screw in engagement with said carriage having a driving connection for actuating said carriage, a clutch on said screw, a dividing tool for opening the nut comprising a grinding tool and a cutter both circular and adjustable, a pinion and a rack for independently advancing and retracting said grinding wheel, a pinion and a rack for advancing and retracting said rotary cutter, a sliding rack for engaging said pinions, cams for engaging said clutches and manually operable means for simultaneously actuating said cams and said sliding rack and rack bar.

The form of the machine at present preferred is illustrated in the accompanying drawings, in which—

Figure 2 is a view in elevation thereof.

The operating parts of the machine are mounted on a table 1, which is supported on legs 2. Bolted to a block on table 1, as at 3, is a casting 4 providing a bearing for the shaft 5, the latter having secured to one end thereof a pulley 6. This pulley is connected by means of a belt 7 to a pulley 8, which is mounted on a power-driven shaft 9. The shaft 9 is supported in cross members 10 and has a pulley 11 thereon, which is connected by a belt 12 to a pulley 8, driving the moving parts of the machine. The motor 13 is positioned under the table 1 supported at 14 by cross members 15. Mounted on the inner end of shaft 5 is a holder 16, which consists of a cup-shaped receptacle provided with threads or spurs 17 for gripping one end of the nut 18.

Supported on the table 1 is a carriage 19 consisting of a lower supporting member or slide 20, mounted to slide in transversely disposed ways 21 with which the top of the table 1 is provided, and an upper sliding table 22 which is mounted on ways 23 on the upper surface of walls 24 of the lower sliding member 20, the depending portions of the sliding table 22 extending into the space between the walls. Bolted to the sliding table 22 at 25 is a casting 26 similar to the casting 4 and which provides a bearing for a shaft 27. Mounted on one end of the shaft 27 is a holder 28, similar in construction to the holder 16. The shaft 27 carries at a point intermediate its ends and adjacent one side of the casting 26, a clutch consisting of a movable member 29 keyed to slide on and constrained to rotate with the shaft, and a stationary member 30 bolted to a block 31 which in turn is bolted as at 32 to the supporting member or slide 20, both clutch members having opposing clutch teeth cut in their end peripheries and being normally held disengaged by means of a spring 33. The movable member 29 is provided with a circumferential groove 34 for the reception of actuating means for throwing the clutch members into engagement as will appear hereinafter.

The shaft 27 extends beyond the sliding table 22 and has fitted thereto at a point on this extended portion a clutch member 35 and a pulley 36 having a clutch member 37 fixed thereto. The pulley 36 is loosely mounted on the shaft 27 and is connected to the power shaft 9 by means of a belt 38 and a pulley 39, the latter being fixed to the shaft 9. The clutch member 35 is constrained to rotate with the shaft 27 by means of a key 40 fitting the key-way 41, which, however, permits this clutch member to slide on the shaft. Both clutch members 35 and 37 are provided with peripheral clutch teeth and are normally held disengaged by means of a spring 42.

The sliding table 22 has a depending portion 43 extending into the space between the walls 24 of the lower supporting member or slide 20 and this depending portion is provided with a threaded opening, the threads of which are engaged by a worm or screw shaft 44 passing therethrough. The screw shaft 44 is fitted at one end in a bearing block 45 secured at 46 to the table 20 and extends through a bearing block 47 secured at 48 to the table 20, the end of the shaft having fitted thereto a clutch member 49, a pulley 50 having a clutch member 51 fixed thereto and a pulley 52. The pulleys 50 and 52 are loosely mounted on the extended portion of the screw shaft 44 by means of a sleeve 53, the pulley 50 being connected to the power-driven shaft 9 by a belt 54 and a pulley 55, and the pulley 52 being connected to the power-driven shaft 9 by a crossed belt 56 and a pulley 57. Clutch members 49 and 51 are normally held disengaged by means of a spring 58, and the clutch member 49, which is mounted to slide on but not to rotate with the screw shaft, is provided with a circumferential groove 59 for the reception of actuating means to throw the opposing clutch teeth on the end peripheries of the clutch members into engagement, as hereinafter described.

Figures 3, 4, 5:
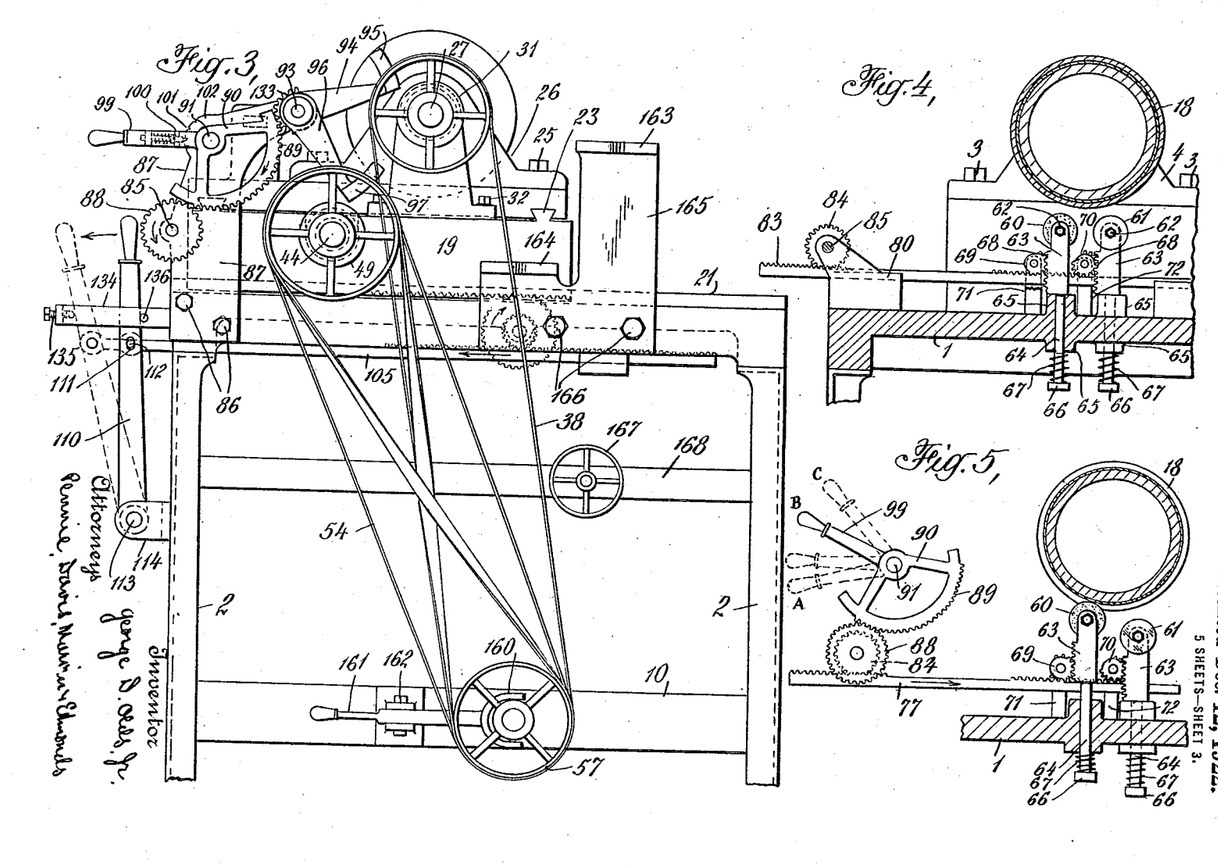
Figure 3 is an end view of the machine.
Figure 4 is a sectional view showing the tools for dividing the nut, and details of the mechanism for advancing and retracting the tools.
Figure 5 is a view, similar to Figure 4, showing the means for actuating the mechanism for advancing and retracting the dividing tools.

The tools for dividing the nut into separate parts to permit of the extraction of the meat therefrom consists of a circular and adjustable grinding tool 60, and a circular and adjustable cutter 61. The grinding tool and cutter are located beneath and substantially midway between the holders 16 and 28 when these are in position engaging the nut, so that the dividing tools may be operated to divide the nut approximately in half transversely of its longer axis. The grinding tool and cutter are similarly mounted as at 62 to the upright supporting brackets 63, carried on the ends of rods 64 which pass through openings in the table 1. Surrounding the openings in the table 1 are bosses 65 to provide a sufficient bearing surface for the rods 64, and the rods have heads 66 at their ends for retaining between them and the bosses 65, on the under side of table 1, springs 67 which serve to retain the grinding wheel 60 and cutter 61 in their lowered or inactive positions beneath the nut as illustrated in Figure 4. The upright supporting brackets 63 are provided with racks 68, and these racks are engaged by the pinions 69 and 70 supported respectively by upright supporting brackets 71 and 72, extending upwardly from the table 1. The pinions 69 and 70 each have a double set of teeth, one set 73, of pinion 69, being in engagement with one of the racks 68 and one set 74, of pinion 70, being in engagement with the other rack 68, which racks carry respectively the grinding wheel 60 and the circular cutter 61. The other set of teeth 75, of pinion 69, is in engagement with rack teeth 76 on a rack bar 77, which is mounted to reciprocate in guide ways 80 in blocks 78 and 79 supported on table 1. The other set of teeth 81, of pinion 70, is adapted to be engaged by rack teeth 82 on rack bar 77. The racks 76 and 82 are positioned on opposite sides of the rack bar and adjacent the edges thereof, and it will be noted that the brackets 63, carrying the grinding wheel and cutter respectively, and supported on the ends of rods 67, are positioned on opposite sides of the rack bar, and extending inwardly therefrom, so that the grinding wheel and cutter are in alignment, the grinding wheel being located forwardly of the cutter. At the end of the rack bar 77 is a rack 83 which is engaged by a pinion 84 mounted on a shaft 85. Bolted as at 86 to the table 1 of the machine is a bracket 87 through which the shaft 85 extends, and fitted to the end of this shaft is a toothed wheel 88 adapted to be engaged by the teeth 89 covering a portion of the outer periphery of a segment 90 mounted on stud shaft 91, the latter being supported in the bracket 87. The bracket 87 has a sleeve portion 92 at its upper part serving as a bearing for a stud shaft 93 at one end of which is fitted an arm 94 carrying a cam 95, and at the other end an arm 96 carrying a cam 97, the cams 95 and 97 being adapted to enter the grooves 34 and 59 respectively in the movable clutch members 29 and 49. Also fixed to the shaft 93 is a pinion 133 which is adapted to be engaged by the teeth on the segment 90. The segment 90 has an inwardly extending portion 98 projecting from which is a handle 99 for manually rotating the segment to oscillate the shaft 93 and the cam arms 94 and 96 and thus move the cams 95 and 97 into and out of engagement with the grooves 34 and 59 respectively. The handle 99 carries at its inner side a spring-pressed pawl 100 which engages notches 101 in the curved portion 102 of the frame 87 so that the handle may be secured in different positions.

Mounted to reciprocate in depending projections 103 and 104 of table 1 is a rack bar 105, the teeth of which engage a small pinion 106 fixed to a stud shaft 107. Fixed to the same shaft is a gear wheel 108, the teeth of which are in engagement with rack teeth 109 on the under side of the lower supporting member or slide 20. The outer end of the rack bar 105 is engaged by a handle 110 having a slot 111 in which projects a pin 112 on the end of the rack bar. The handle 110 is pivoted at 113 in a lug 114 projecting from a cross member 115 connecting the supporting legs 2. The upper part of the handle 110 is supported in a bracket 134 and this bracket has at its outer end an adjustable stop 135 for limiting the outward throw of the handle, and a stop 136 for limiting the inward throw thereof. The adjustable stop may thus be regulated to limit the lateral travel of the carriage 19 when actuated by the outward throw of handle 110, so that the extracting tools will be in proper starting position for nuts of different sizes. Supporting means for the stud shaft 107 are provided by lugs 116 depending from the under surface of the table 1, and the latter is recessed at 117 to provide a space in which the pinion 106 and the gear wheel 108 may rotate.

The cutting and shredding tools of the machine will now be described. One of these sets of tools is mounted on the table 1, and the other set on the sliding table 22, and inasmuch as the tools proper, comprising each of these sets, are of the same construction, the description of one set will serve for both.

Figure 9:
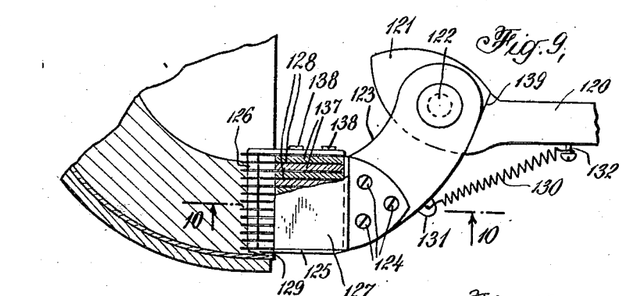
Figure 9 is a detail plan view of one of the extracting and shredding tools in operative position.
Figure 10:
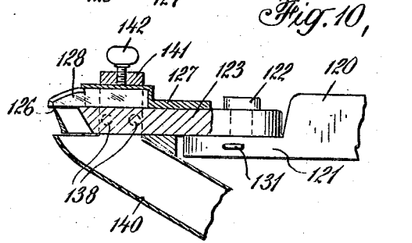
Figure 10 is a view along the line 10—10 of Figure 9.
Figure 11:
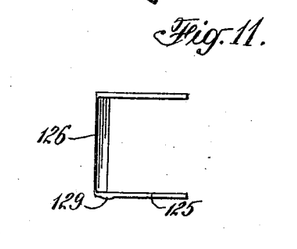
Figure 11 is a separate view of the cutting tool and frame in which it is mounted.

The casting 4 has a block 118 provided with an opening in which is adjustably secured by screws 119, a supporting arm 120. The arm 120 has a reduced end portion 121 on which is pivoted at 122 a curved arm 123. The arm 123 has, secured at the end thereof, as at 124, a member 127 in which the shredding knives 128, having upwardly extending cutting edges, are mounted, the knives being spaced apart as by metal strips 137. Also secured to the arm 123, as by means of screws 138, is a frame 125, carrying at its end an upwardly extending cutting edge 126. It will be noted by reference particularly to Figures 9 and 10, that the shredding knives 128 are positioned above the transverse cutting edge 126, and the ends of these knives extend beyond or overlap the cutting edge 126 so that the latter will make a clean cut and the tearing of the shreds, cut by the shredding knives 128, will be prevented. The frame 125 has at one side a projection 129 which is held against the skin of the nut by a spring 130 connecting a lug 131 on the arm 123 with a point 132 on the arm 120. That is to say, the projection 129 will be so held against the skin of the nut when the cutting and shredding tools, mounted on the arm 123, are in correctly adjusted positions for a nut of a given size. Otherwise the swing of the arm 123 carrying these tools in a counterclockwise direction as in Figure 9 is limited by the upwardly extending wall 139 of the arm 120, which thus serves as a stop for the arm 123.

Figure 8:
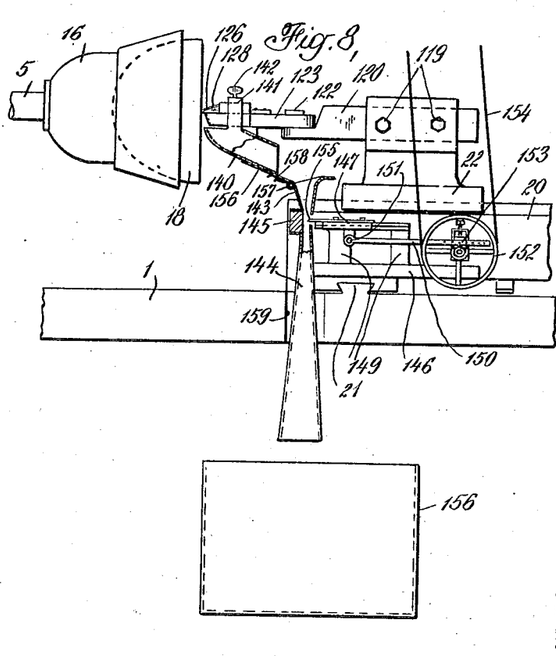
Figure 8 is a detail view in elevation of one of the holders for the nut, and one set of extracting and shredding tools.

The shredded meat extracted from the nut passes through the knives into a conveying chute 140 which is provided with a supporting frame 141 adapted to fit over the cutting and shredding tools and to be adjustably secured thereto by means of a thumb screw 142. The conveying chute 140 forms a part of the conveying means for the shredded meat produced by the cutting and shredding tools mounted on the sliding table 122, which means are illustrated in detail in Figure 8. On the lower supporting slide 20 of the carriage 19 is a funnel shaped conveyor, consisting of a funnel 143 and an upwardly tapering conveying tube 144. Both the funnel and the conveying tube are secured to a cutting block 145 mounted on the lower supporting slide 20. Mounted on a platform 146, which may form a part of the slide 20, is a cutter 147 mounted to reciprocate in ways 148, the latter being supported on standards 149 extending upwardly from the platform 146. The reciprocating cutter is actuated by a connecting rod 150, connected thereto as at 151, and a pulley 152, the connecting rod being eccentrically and adjustably connected to the pulley by suitable means such as illustrated at 153. The pulley 152 is driven by a belt 154 and the cutter 147 is reciprocated against the cutting block 145 to cut the shreds of meat into short lengths as they fall through the cutting and shredding tools, the chute 140, and the funnel 143 across the path of the cutting edge 155. The lengths into which the shreds are cut can be varied by manipulating the adjusting means 153 to change the distance of travel of the cutter 147 along the ways 148. A suitable receptacle 156 is provided to collect the final product of the machine. Since the chute is connected to the cutting and shredding tools which in turn are mounted on the sliding table 22, and the funnel 143 is secured to the lower slide 20, a plate, hinged at 157, is provided to maintain connection between the chute and the funnel when the sliding table 22 is moved to advance the cutting tools in position for the cutting operation, as is illustrated in Figure 8. The hinged plate 157 is held against the under surface of the chute 140 by means of a spring 158. The table 1 is recessed at 159 to accommodate the conveying tube 144 when the slide 20 is moved laterally by means of the handle 110.

Figure 1:
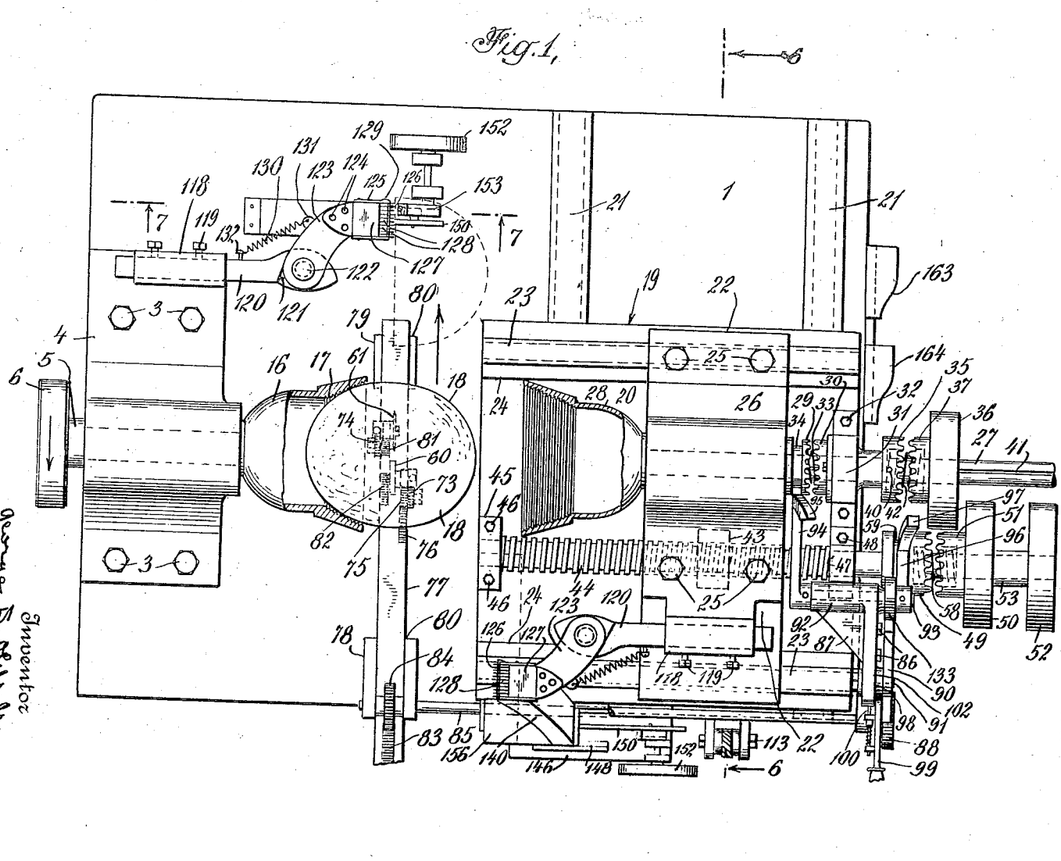
Figure 1 is a plan view of the machine.
Figures 6, 7:
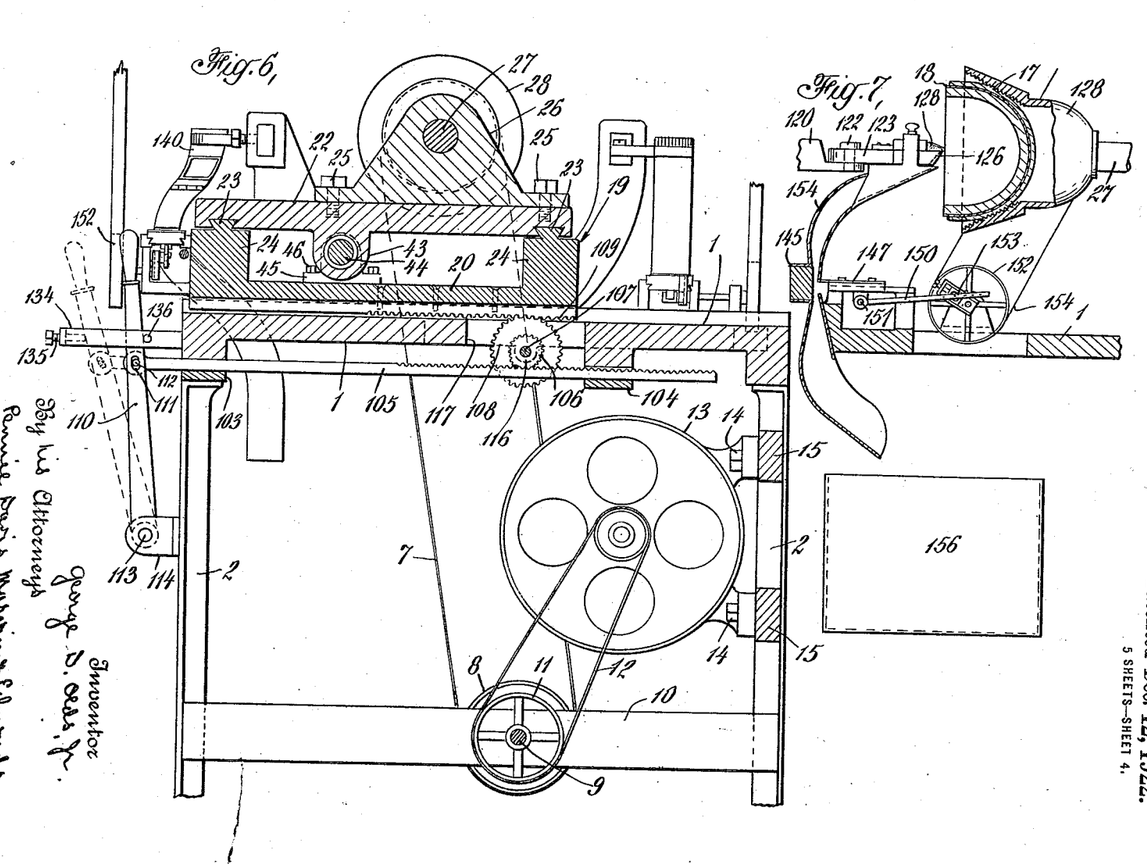
Figure 6 is a sectional view along the line 6—6 of Figure 1.
Figure 7 is a sectional view along the line 7—7 of Figure 1.

The cutting and shredding tools and the reciprocating cutter illustrated in Figure 7 are mounted on the table 1 as shown in Figure 1. Here the pulley 152 is mounted in a bearing 153 extending upwardly from the table 1, and the conveying chute 154 is continuous as illustrated, since the cutting and shredding tools do not move relatively to the chute and no telescoping arrangement is consequently necessary to maintain a connection between the chute and the cutting and shredding tools.

In operation, the coconut is first inserted in the holder 16, the positions of the operating parts of the machine being those illustrated in Figures 1 and 2. The handle 99 is then operated downwardly from its normal horizontal position to the position A in Figure 5, which brings the teeth 89 on the segment 90 into engagement with the pinion 133, thus rotating the pinion, the shaft 93 to which it is fixed, and throwing the arms 94 and 96 downwardly and the cams 95 and 97 in engagement with the grooves 34 and 59 respectively in the movable clutch members 29 and 49. The cams throw the movable clutch member 29 into engagement with the stationary clutch member 30 to prevent rotation of the holder 28, and the clutch member 49 is thrown into engagement with the clutch member 51, connecting the screw shaft 44 with the sleeve 53 and the pulleys 50 and 52 mounted thereon. The screw shaft will be driven in one direction or the other according as the sleeve 53 is driven by the pulley 55 or the pulley 57. A clutch 160, operated by a forked handle 161 pivoted at 162, is provided to connect and disconnect the pulleys 55 and 57 from the power shaft 9. When the handle 99 is operated downwardly as described to throw in the clutch members 29 and 30 and the clutch members 49 and 51, the pulley 55 is connected with the power shaft 9 and the screw shaft 44 is rotated to move the sliding table 22 in a direction to the left in Figure 1, thus advancing the holder 28 and the cutting and shredding tools mounted thereon to a position as illustrated in Figure 2. The holder 28 being held stationary and the holder 16 in which one end of the nut 18 is inserted being constantly rotated through its connection with the power shaft 9, the other end of the nut 18 is screwed into the holder 28, as the table 22 continues its movement to the left under the action of the screw shaft 44. When the end of the nut 18 is seated in the holder 28, the handle 99 is moved upwardly to the position B in Figure 5, whereby the teeth 89 on the segment 90 are brought into engagement with the pinion 88 on the shaft 85, thus rotating the shaft 85 and the pinion 84 and causing the rack bar 77, in engagement with the latter, to move to the right as illustrated in Figure 5. The pinion 69, coming immediately into engagement with the rack 76, is moved to advance the grinding tool 60 against the shell of the nut. The grinding tool operates to penetrate the shell, and the handle is then moved to the position C in Figure 5, which further movement brings the rack 82 into engagement with the pinion 70 to advance the cutter 61 against the nut, and, being in alignment with the grinding tool, enters the slot cut through the shell thereby to cut the meat of the nut. The upward movement of the grinding wheel 60 is stopped before the meat of the nut is cut to prevent the accumulation of any saw-dust in the meat, and, since the cutter 61 has a knife edge, no saw-dust is formed thereby when cutting through the meat of the nut. After the separation of the nut into two parts by the dividing tools 60 and 61, the handle 110 is pulled outwardly from its position indicated in full lines in Figure 3, which causes the rack bar 105 to move to the left in this figure and the pinion 106 and gear wheel 108 be rotated. As the gear wheel 108 meshes with the rack 109 on the slide 20, the carriage 19 is moved laterally across the table 1 on ways 21 to carry the portion of the nut gripped by the holder 28 in position opposite the cutting and shredding tools mounted on the table, as indicated in dotted lines in Figure 1. Since the carriage 19 is moved laterally from its position illustrated in Figure 1, the cams 95 and 97 become disengaged from the movable cam members 29 and 49, which are then returned to their initial positions as illustrated in Figure 1 by the springs 33 and 58 respectively. During the movement of the carriage 19 laterally of the table 1, under the action of the mechanism controlled by the handle 110, the movable clutch member 31 comes into engagement with a cam 163 and the movable clutch member 49 with a cam 164, both these cams forming a part of a frame 165 secured at 166 to the table 1. The clutches 31—37 and 49—51 are thereby thrown into engagement, the holder is set in rotation by the pulley 36, and the screw 44 again rotating to feed the portions of the nut held in the holders 16 and 28 against the shredding and cutting tools. After having been disengaged from the sleeve 53, when removed from the cam 97, the screw shaft 44 continues to move the sliding table 22 to the left in Figure 1, during the meat extracting and shredding operation, the meat in one part of the nut being subjected to the action of the cutting and shredding tools mounted on the table 1 and in the other part to the corresponding tools mounted on the sliding table 22. When the meat extracting operation is completed, the clutch 160 is operated by the handle 161 to connect the power shaft 9 with the pulley 57, which through the cross belt 56 and the pulley 52 turns the screw shaft 44 in the reverse direction to retract the movable table 22, the handle 110 is then operated inwardly to bring the carriage 19 to its initial position as indicated in Figure 1. The meat extracted from the nut, shredded, and cut into short lengths passes through the cutting and shredding tools to the receptacle 156 by the means and in the manner hereinbefore described.

An idler 167, mounted on cross-member 168 connecting the legs 2 of the table, is provided to take up the slack in belt 38 when the carriage 19 is moved laterally across the table 1 into position to feed the separate parts of the nut against the cutting and extracting tools. The lateral movement of the carriage 19 is limited by the stops 135 and 136 in the path of the handle 110, and by adjusting the stop 135, the movement of the carriage may be regulated to bring the cutting and extracting tools in proper position for nuts varying in size.

What I claim is:

1. In a machine for extracting coconut meat, a holder for a portion of a nut having one end open to expose the meat therein, means for rotating the holder, a carriage, a tool mounted on said carriage for extracting the meat from the shell of the nut, and devices for moving the carriage relatively to the holder to feed the extracting tool against the meat of the nut.

2. In a machine for extracting coconut meat, a carriage, a holder for a portion of a nut having one end open to expose the meat therein which is mounted on said carriage, a tool for extracting the meat from the shell of the nut, means for rotating the holder, and devices for moving the carriage relatively to the holder to feed the meat of the nut against said extracting tool.

3. In a machine for extracting coconut meat, a holder for the nut, a circular, adjustable dividing tool for opening the nut, a tool for extracting the meat from the shell thereof, means for advancing and retracting the dividing tool to operative and inoperative positions respectively, and means for moving the holder and tool relatively one to the other which is constructed and arranged so that the meat of the nut is subjected to the action of said extracting tool.

4. In a machine for extracting coconut meat, a holder for the nut, a circular, adjustable dividing tool for opening the nut, a tool for extracting the meat from the shell thereof, manually operable means for moving the dividing tool to operative and inoperative positions respectively, and means for moving the holder and tool relatively one to the other which is constructed and arranged so that the meat of the nut is subjected to the action of said extracting tool.

5. In a machine for extracting coconut meat, a holder for the nut, a dividing tool for opening the nut comprising a grinding tool for penetrating the shell of the nut and a cutting tool for cutting through the meat thereof to divide the nut, a tool for extracting the meat from the shell, and means for moving the holder and extracting tool relatively one to the other which is constructed and arranged so that the meat of the nut is subjected to the action of said extracting tool.

6. In a machine for extracting coconut meat, a holder for the nut, a dividing tool for opening the nut comprising a grinding tool for penetrating the shell of the nut and a cutting tool for cutting through the meat thereof to divide the nut, a tool for extracting the meat from the shell, means for advancing first the grinding tool and then the cutting tool to operative positions respectively and for retracting both to inoperative positions, and means for moving the holder and extracting tool relatively one to the other which is constructed and arranged so that the meat of the nut is subjected to the action of said extracting tool.

7. In a machine for extracting coconut meat, a holder for the nut, a dividing tool for opening the nut comprising a circular, adjustable grinding tool for penetrating the shell of the nut and a circular, adjustable cutter for cutting through the meat thereof to divide the nut, a tool for extracting the meat from the shell thereof, manually operable means for advancing first the grinding tool and then the stationary cutter to operative positions respective relatively to the nut and for then retracting both to inoperative positions, and means for moving the holder and extracting tool relatively one to the other which is constructed and arranged so that the meat of the nut is subjected to the action of said extracting tool.

8. In a machine for extracting coconut meat, a support for the nut, a cutting tool having a cutting edge extending transversely of the axis of the support, and means for moving the support and the cutting tool relatively one to the other to feed the meat of the nut against said cutting edge.

9. In a machine for extracting coconut meat, a support for the nut, a cutting tool having a cutting edge extending transversely of the axis of the support and upwardly and rearwardly, and means for moving the support and the cutting tool relatively one to the other to feed the meat of the nut against said cutting edge.

10. In a machine for extracting coconut meat, a holder for the nut, a cutting tool having a cutting edge extending transversely of the axis of the holder, means for moving the holder and cutting tool relatively one to the other to feed the meat of the nut against said cutting edge, and means for guiding the end of the cutting edge along the interior of the shell and for spacing said cutting edge therefrom.

11. In a machine for extracting coconut meat, a holder for the nut, a cutting tool having a cutting edge extending transversely of the axis of the holder, means for adjusting the cutting tool relatively to the holder to regulate the depth of the cut transversely of the meat of the nut, and means for moving the holder and the cutting tool relatively one to the other to feed the meat of the nut against said cutting edge.

12. In a machine for extracting and shredding coconut meat, a support for the nut, means for extracting the meat from the nut including a shredding tool for cutting the meat into strips, and means for moving the support and said extracting means relatively one to the other to subject the meat of the nut to the action of the cutter.

13. In a machine for extracting and shredding coconut meat, a support for the nut, means for extracting the meat from the shell thereof including a shredding tool for cutting the meat into strips, comprising a plurality of substantially parallel cutting edges and means for moving the support and extracting means relatively one to the other to subject the meat of the nut to the action of the latter.

14. In a machine for extracting and shredding coconut meat, a support for the nut, a cutting tool for cutting the meat from the shell thereof, a shredding tool for cutting the meat into strips comprising a plurality of substantially parallel cutters having their cutting edges extending upwardly, and means for rotating the support and said cutting edge and shredding tool relatively one to the other whereby the meat of the nut is subjected to the action of said cutting edges.

15. In a machine for extracting and shredding coconut meat, a support for the nut, a cutting tool consisting of a cutting edge extending transversely of the axis of the support, a shredding tool consisting of a plurality of cutting edges extending transversely of and beyond the edge of the cutting tool, and means for rotating the support and said cutting and shredding tools relatively one to the other whereby the meat of the nut is subjected to the action of said cutting edges.

16. In a machine for extracting and shredding coconut meat, a holder for the nut, a cutting and shredding unit for extracting the meat from the shell of the nut and cutting it into shreds, comprising a cutting tool having its cutting edge extending transversely of the axis of the holder and a shredding tool having a plurality of cutting edges disposed transversely of and beyond the edge of the cutting tool, means for guiding said cutting and shredding unit along and for spacing it from the interior surface of the shell, and means for adjusting said unit and said holder relatively to regulate the depth of the cut.

17. In a machine for extracting and shredding coconut meat, a holder for the nut, a cutting and shredding unit for extracting the meat from the shell of the nut and cutting it into shreds, comprising a cutting tool having its cutting edge extending transversely of the axis of the holder and a shredding tool having a plurality of cutting edges disposed transversely of and beyond the edge of the cutting tool, means for guiding said cutting and shredding unit along and for spacing it from the interior surface of the shell, and means for adjusting said unit and said holder relatively to regulate the depth of the cut, said unit being pivotally mounted in the machine and having resilient means connected thereto for pressing said unit against the shell of the nut.

18. In a machine for extracting coconut meat, a holder for the nut, means for extracting the meat from the shell thereof including a shredding tool for cutting into strips, means for chopping said strips into comparatively short lengths, and means for moving the holder and said extracting means relatively one to the other to subject the meat of the nut to the action of the latter.

19. In a machine for extracting coconut meat, a holder for the nut, means for extracting the meat from the shell thereof including a shredding tool for cutting the meat into strips, a reciprocating cutter for chopping said strips into comparatively short lengths which is adjustable to vary the lengths of the strips cut off, means for actuating said reciprocating cutter and means for moving the holder and said extracting means relatively one to the other to subject the meat of the nut to the action of the latter.

20. In a machine for extracting coconut meat, a holder for the nut, means for extracting the meat from the shell thereof including a shredding tool for cutting the meat into strips, means for chopping said strips into comparatively short lengths, a conveying chute for carrying the shredded meat to a receptacle, and means for moving the holder and extracting means relatively one to the other to subject the meat of the nut to the action of the latter.

21. In a machine for extracting coconut meat, a holder for gripping one end of the nut, a cooperative holder movable relatively to the first holder for gripping the other end of the nut, a dividing tool for separating the nut between its ends, means for extracting the meat from the separate parts of the nut, and means for moving said holders and said extracting means relatively one to the other which is constructed and arranged so that the meat in each of the parts of the nut is subjected to the action of said extracting means.

22. In a machine for extracting coconut meat, a holder for gripping one end of the nut, a cooperative holder movable relatively to the first holder for gripping the other end of the nut, a dividing tool for separating the nut between its ends, means for extracting the meat from the separate parts of the nut, and means for moving said holder and said extracting means relatively one to the other which is constructed and arranged so that the meat in each of the parts of the nut is simultaneously subjected to the action of said extracting means.

23. In a machine for extracting coconut meat, a holder for gripping one end of the nut, a cooperative holder for gripping the other end of the nut, sets of tools for extracting the meat from the shell of the nut which are adapted to coact with each of said holders, said tools and said holders being rotatable relative one to the other, a dividing tool for separating the nut between its ends, a movable carriage for mounting one of said sets of extracting tools and said cooperative holder, and devices for actuating said carriage relatively to the other of said sets of tools and holder first in a direction axially of the holders to bring the cooperative holder in engagement with the nut, then laterally after the separation of the nut to bring the parts thereof opposite the respective extracting tools therefor, and finally again axially to subject the meat in said parts to the action of the extracting tool, and manually operable means for controlling said actuating devices.

24. In a machine for extracting and shredding coconut meat, a table, a carriage mounted on said table to move longitudinally and laterally thereof, a holder mounted on the table for gripping one end of the nut, a cooperating holder mounted on the carriage for gripping the other end of the nut, sets of extracting and shredding tools adapted to coact with each of said holders, one set being mounted on the table and the other set on the carriage, a dividing tool for separating the nut between the ends thereof, and devices for actuating the carriage first in a direction to bring said cooperating holder into engagement with the nut, then laterally after the separation of the nut to bring the parts thereof opposite the respective extracting tools, and finally in a direction to subject the meat in the said parts to the action of said extracting tools, and manually operable means for controlling said actuating devices.

25. In a machine for extracting coconut meat, a table, a carriage mounted on said table, a pair of holders for the nut and a pair of extracting tools adapted to coact therewith, one of said holders and one of said extracting tools being mounted on carriage, and devices for actuating the carriage comprising a screw in engagement with the carriage, means for driving said screw, a rack on the carriage, a pinion in engagement with the rack, and manually operable means for controlling said driving means and for rotating said pinion.

26. In a machine for extracting coconut meat, a table, a carriage, a holder having interior threads for gripping one end of the nut and a tool for extracting coconut meat both mounted on the table, a driving connection for rotating said holder, a shaft and an extracting tool mounted on said carriage, a clutch on said shaft having a stationary member, a second holder having interior threads supported on said shaft, a screw in engagement with said carriage having a driving connection for actuating the carriage, a clutch on said screw, a dividing tool for opening the nut, and means which is constructed and arranged to operate said clutches when moved in one direction and to advance or retract said dividing tool when moved in the opposite direction.

27. In a machine for extracting and shredding coconut meat, a table, a carriage having a rack thereon, a pinion in engagement with the rack, a reciprocating rack bar for actuating the pinion, a holder for gripping one end of the nut and a tool for extracting coconut meat both mounted on the table, a driving connection for rotating said holder, a shaft and an extracting tool mounted on said carriage, a clutch on said shaft having a stationary member, a second holder supported on said shaft, a screw in engagement with said carriage having a driving connection for actuating said carriage, a clutch on said screw, a dividing tool for opening the nut comprising a circular, adjustable grinding tool and a circular, adjustable cutter, a pinion and a rack for independently advancing and retracting said grinding wheel, a pinion and a rack for advancing and retracting said rotary cutter, a sliding rack for engaging said pinions, cams for engaging said clutches and manually operable means for simultaneously actuating said cams and said sliding rack and rack bar.

In testimony whereof I affix my signature.

GEORGE D. OLDS, Jr.